(12) United States Patent
Valero et al.

(10) Patent No.: US 7,337,068 B2
(45) Date of Patent: *Feb. 26, 2008

(54) GLOBAL CLASSIFICATION OF SONIC LOGS

(75) Inventors: Henri-Pierre Valero, Machida (JP); Alain Brie, Versailles (FR); Takeshi Endo, Sagamihara (JP)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/010,204

(22) Filed: Dec. 10, 2004

(65) Prior Publication Data

US 2005/0143922 A1   Jun. 30, 2005

Related U.S. Application Data

(63) Continuation of application No. 10/005,497, filed on Nov. 8, 2001, now Pat. No. 6,845,325.

(51) Int. Cl.
*G01V 1/00* (2006.01)

(52) U.S. Cl. .......................................... 702/14; 367/29

(58) Field of Classification Search ............... 702/14, 702/6, 11, 18; 703/5; 367/29, 25, 27, 28, 367/30, 33; 181/106, 113
See application file for complete search history.

(56) References Cited

U.S. PATENT DOCUMENTS

| | | | |
|---|---|---|---|
| 6,477,112 B1 * | 11/2002 | Tang et al. | 367/38 |
| 6,526,354 B2 * | 2/2003 | Bose et al. | 702/14 |
| 6,625,541 B1 * | 9/2003 | Shenoy et al. | 702/6 |
| 6,845,325 B2 * | 1/2005 | Valero et al. | 702/14 |
| 6,868,341 B2 * | 3/2005 | Valero | 702/11 |

\* cited by examiner

*Primary Examiner*—Michael P. Nghiem
*Assistant Examiner*—Toan M. Le
(74) *Attorney, Agent, or Firm*—Karan Singh; Jaime Castano; Dale Gaudier

(57) ABSTRACT

A method of determining the sonic slowness of a formation traversed by a borehole comprising generating tracks from sonic waveform peaks received at a plurality of depths wherein the peaks that are not classified prior to tracking is set forth. A method for generating a slowness versus depth log is generated for waveform arrivals by classifying long tracks, classifying small tracks; classifying tracks that overlap; filling in gaps; and creating a final log is disclosed. In further improvements, non-classified tracks and interpolation are used to fill in gaps.

44 Claims, 8 Drawing Sheets

GLOBAL CLASSIFICATION OF SONIC LOGS

CROSS REFERENCE TO RELATED APPLICATIONS

This application is related to co-owned U.S. Pat. Nos. 4,808,236; 5,661,696; 5,594,706; 5,587,966; and 5,278,805, and U.S. patent application Ser. No. 09/591,405 now U.S. Pat. No. 6,625,541 and Ser. No. 09/678,454 now U.S. Pat. No. 6,459,993; and PCT/IB00/00353, and is a continuation of prior U.S. application Ser. No. 10/005,497, filed Nov. 8, 2001, now U.S. Pat. No. 6,845,325, the complete disclosures of which are hereby incorporated by reference.

BACKGROUND OF THE INVENTION

This invention relates to sonic well logging used in the hydrocarbon well exploration. More particularly, the invention relates to methods for processing sonic well log waveforms.

Sonic logging of wells is well known in hydrocarbon exploration. Sonic well logs are generated using sonic tools typically suspended in a mud-filled borehole by a cable. The sonic logging tool typically includes a sonic source (transmitter), and a plurality of receivers (receiver array) that are spaced apart by several inches or feet. It is noted that a sonic logging tool may include a plurality of transmitters and that sonic logging tools may be operated using a single transmitter (monopole mode), dual transmitters (dipole mode) or a plurality of transmitters (multipole mode). A sonic signal is transmitted from the sonic source and detected at the receivers with measurements made every few inches as the tool is drawn up the borehole. The sonic signal from the transmitter enters the formation adjacent to the borehole and part of the sonic signal propagates in the borehole.

Sonic waves can travel through formations around the borehole in essentially two forms: body waves and surface waves. There are two types of body waves that travel in formation: compressional and shear. Compressional waves, or P-waves, are waves of compression and expansion and are created when a formation is sharply compressed. With compressional waves, small particle vibrations occur in the same direction the wave is traveling. Shear waves, or S-waves are waves of shearing action as would occur when a body is struck from the side. In this case, rock particle motion is perpendicular to the direction of wave propagation.

Surface waves are found in a borehole environment as complicated borehole-guided waves coming from reflections of the source waves reverberating in the borehole. The most common form of surface wave is the Stoneley wave. In situations where dipole (directional) sources and receivers are used, an additional flexural wave propagates along the borehole and is caused by the flexing action of the borehole in response to the dipole signal form the source. It is noted that sonic waves also will travel through the fluid in the borehole and along the tool itself. With no interaction with the formation, these waves do not provide useful information and may interfere with the waveforms of interest.

Typically, compressional (P-wave), shear (S-wave) and Stoneley arrivals are detected by the receivers. The speeds at which these waves travel through the rock are controlled by rock mechanical properties such as density and elastic dynamic constants, and other formation properties such as amount and type of fluid present in the rock, the makeup of the rock grains and the degree of intergrain cementation.

Thus by measuring the speed of sonic wave propagation in a borehole, it is possible to characterize the surrounding formations by parameters relating to these properties. The information recorded by the receivers is typically used to determine formation parameters such as formation slowness (the inverse of sonic speed) from which pore pressure, porosity, and other determinations can be made. The speed or velocity of a sonic wave is often expressed in terms of 1/velocity and is called "slowness." Since the tools used to make sonic measurements in boreholes are of fixed length, the difference in time ($\Delta T$) taken for a sonic wave to travel between two points on the tool is directly related to the speed/slowness of the wave in the formation. In certain tools such as the DSI™ (Dipole Sonic Imager) tool (a trademark owned by Schlumberger), the sonic signals may be used to image the formation.

Details relating to sonic logging and log processing techniques are set forth in U.S. Pat. No. 4,131,875 to Ingram; U.S. Pat. No. 4,594,691 to Kimball and Marzetta; U.S. Pat. No. 5,278,805 to Kimball; U.S. Pat. No. 5,831,934 to Gill et al.; A. R. Harrison et al., "Acquisition and Analysis of Sonic Waveforms From a Borehole Monopole and Dipole Source . . ." SPE 20557, pp. 267-282 (September 1990); and C. V. Kimball and T. L. Marzetta, "Semblance Processing of Borehole Acoustic Array Data", Geophysics, Vol. 49, pp. 274-281 (March 1984), all of which are incorporated by reference herein in their entireties.

Figure 1:
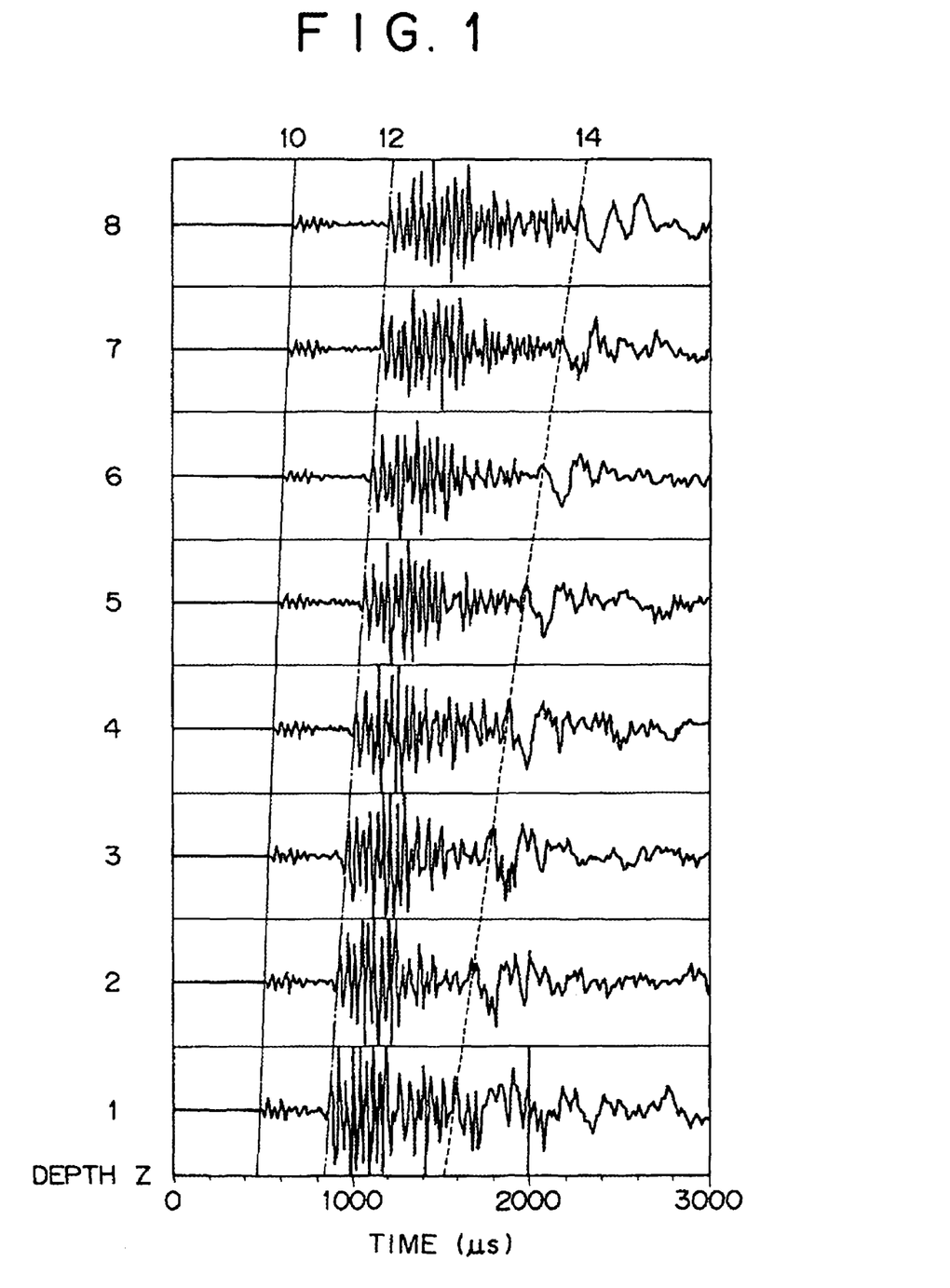
FIG. 1 shows prior art waveforms from a receiver array.

The response of any given one of receivers to a sonic signal from a transmitter is typically a waveform as shown in FIG. 1 for an eight-receiver array. Sonic waveforms 1 through 8 as received at different receivers within the array are shown. The responses of the several receivers are staggered in time due to the different spacing of the receivers from the transmitter. The first arrivals 10 shown are compressional waves, followed by the arrival of shear waves 12 and then the arrival of Stoneley waves 14. It will be appreciated that where the sonic signal detected is non-dispersive (e.g. P-waves and S-waves), the signal obtained at each receiver will take the same or similar form. However, where the sonic signal is dispersive (e.g. Stoneley and flexural waves), the signal obtained at the different receivers will appear different.

In most formations, the sonic speeds in the tool and the wellbore mud are less than the sonic speed in the formation. In this typical situation, the compressional (P-waves), shear (S-waves), and Stoneley or tube wave arrivals and waves are detected by the receivers and are processed. Sometimes, the sonic speed in the formation is slower than the drilling mud; i.e., the formation is a "slow" formation. In this situation, there is no refraction path available for the shear waves, and typically shear (S-waves) arrivals are not measurable at the receivers. However, the shear slowness of the formation is still a desirable formation parameter to obtain. Although without shear wave signal detection, direct measurement of formation shear slowness is not possible but it may be determined from other measurements.

One way to obtain the slowness of a formation from an array of sonic waveforms is to use slowness-time-coherence (STC) processing. One type of STC processing is presented in U.S. Pat. No. 4,594,691, incorporated herein in its entirety. STC processing is a full waveform analysis technique that aims to find all propagating waves in a composite waveform. The result of the process is a collection of semblance peaks in a slowness-time plane for various depths. At each depth the peaks may be associated with different waveform arrivals. The processing adopts a semblance algorithm to detect arrivals that are coherent across the array of receivers and estimates their slowness. The basic algorithm advances a fixed-length time window across the waveforms in small overlapping steps through a range of potential arrival times. For each time position, the window position is moved out linearly in time, across the array of receiver waveforms, beginning with a moveout corresponding to the fastest wave expected and stepping to the slowest wave expected. For each moveout, a coherence function is computed to measure the similarity of the waves within the window. When the window time and the moveout correspond to the arrival time and slowness of a particular component, the waveforms within the window are almost identical, yielding a high value of coherence. In this way, the set of waveforms from the array is examined over a range of possible arrival times and slownesses for wave components.

STC processing produces coherence (semblance) contour plots in the slowness/arrival time plane. The semblance function relates the presence or absence of an arrival with a particular slowness and particular arrival time. If the assumed slowness and arrival time do not coincide with that of the measured arrival, the semblance takes on a smaller value. Consequently, arrivals in the received waveforms manifest themselves as local peaks in a plot of semblance versus slowness and arrival time. These peaks are typically found in a peak-finding routine discussed in the aforementioned article by Kimball and Marzetta.

As the output of STC processing is a coherence plot, the coherence of each arrival can be used as a quality indicator, higher values implying greater measurement repeatability. When processing dipole waveforms, one of the coherence peaks will correspond to the flexural mode but with a slowness that is always greater (slower) than the true shear slowness. A precomputed correction is used to remove this bias.

In simple STC processing, all receiver stations are considered. Another type of slowness-time-coherence is processing multi-shot slowness-time-coherence (MSTC) processing wherein sub-arrays of receiver stations within the receiver array are considered. MSTC processing is described in U.S. patent application Ser. No. 09/678,454, incorporated herein by reference in its entirety.

In the aforementioned methods, the same back-propagation and stacking techniques are used regardless of whether the wave being analyzed is a P-wave, S-wave, or a Stoneley wave; i.e., regardless of whether the wave is non-dispersive or dispersive. Additional techniques are known to address dispersive waves. For dispersive waves, STC processing is modified to take into account the effect of frequency and dispersion.

Bias-corrected STC as described in U.S. Pat. No. 5,229, 939, incorporated herein in its entirety, involves processing the flexural waveform using STC methods but correcting the non-dispersive processing results by a factor relating to the measured slowness and hole diameter, that is, post-processing the STC results. In particular, correction values are obtained by processing model waveforms with the STC techniques and comparing the measured slowness with the formation shear slowness of the model.

A second technique to provide slowness logging which accounts for dispersion is known as Dispersive Slowness Time Coherence (DSTC) processing or Quick DSTC (QD-STC) and presented in U.S. Pat. No. 5,278,805, the contents of which are incorporated herein by reference. DTSC processing broadly comprises back-propagating detected dispersive waveforms in the Fourier domain while accounting for dispersion and then stacking the processed waveforms. DSTC processing has the ability to be applied to non-dispersive waves such as monopole compressional or shear waves, Since the first step required for DSTC processing is the calculation or selection or an appropriate dispersion curve, all that is required is a dispersion curve that represents a non-dispersive wave, i.e., a flat "curve".

The first step in slowness-time coherence processing is computing semblance, a two-dimensional function of slowness and time, generally referred to as the STC slowness-time plane. The semblance is the quotient of the beam-formed energy output by the array at slowness p (the "coherent energy") divided by the waveform energy in a time window of length T (the "total energy"). The semblance function is given by Equation (1) where $x_i(t)$ is the waveform recorded by the i-th receiver of an M-receiver equally spaced array with inter-receiver spacing $\Delta Z$. The array of waveforms $\{x_i(t)\}$ acquired at depth z constitutes a single frame of data.

$$\rho(\tau, p) = \frac{\int_\tau^{\tau+T} \left[\sum_{i=0}^{M-1} x_i(t + i\Delta z p)\right]^2 dt}{M \int_\tau^{\tau+T} \sum_{i=0}^{M-1} [x_i(t + i\Delta z p)]^2 dt} \quad (1)$$

The semblance $\rho(\tau,p)$ for a particular depth z is a function of time $\tau$ and slowness p.

A second step is identifying peaks corresponding to high coherence on the slowness-time plane. Peaks are identified by sweeping the plane with a peak mask. The peak mask is a parallelogram having a slope that corresponds to the transmitter-receiver spacing. A peak is defined as a maximum within the mask region. For each peak, five variables are recorded: the slowness coordinate p, the time coordinate $\tau$, the semblance $\rho(\tau,p)$, the coherent energy (the numerator of Equation 1), and the total energy (the denominator of Equation 1).

Peaks in coherence values signify coherent arrivals in the waveforms. For each depth, a contour plot of coherence as a function of slowness and time, referred to the slowness-time plane, can be made. Classification occurs when the slowness and arrival time at each coherence peak are compared with the propagation characteristics expected of the arrivals being sought and the ones that best agree with these characteristics are retained.

Figure 2:
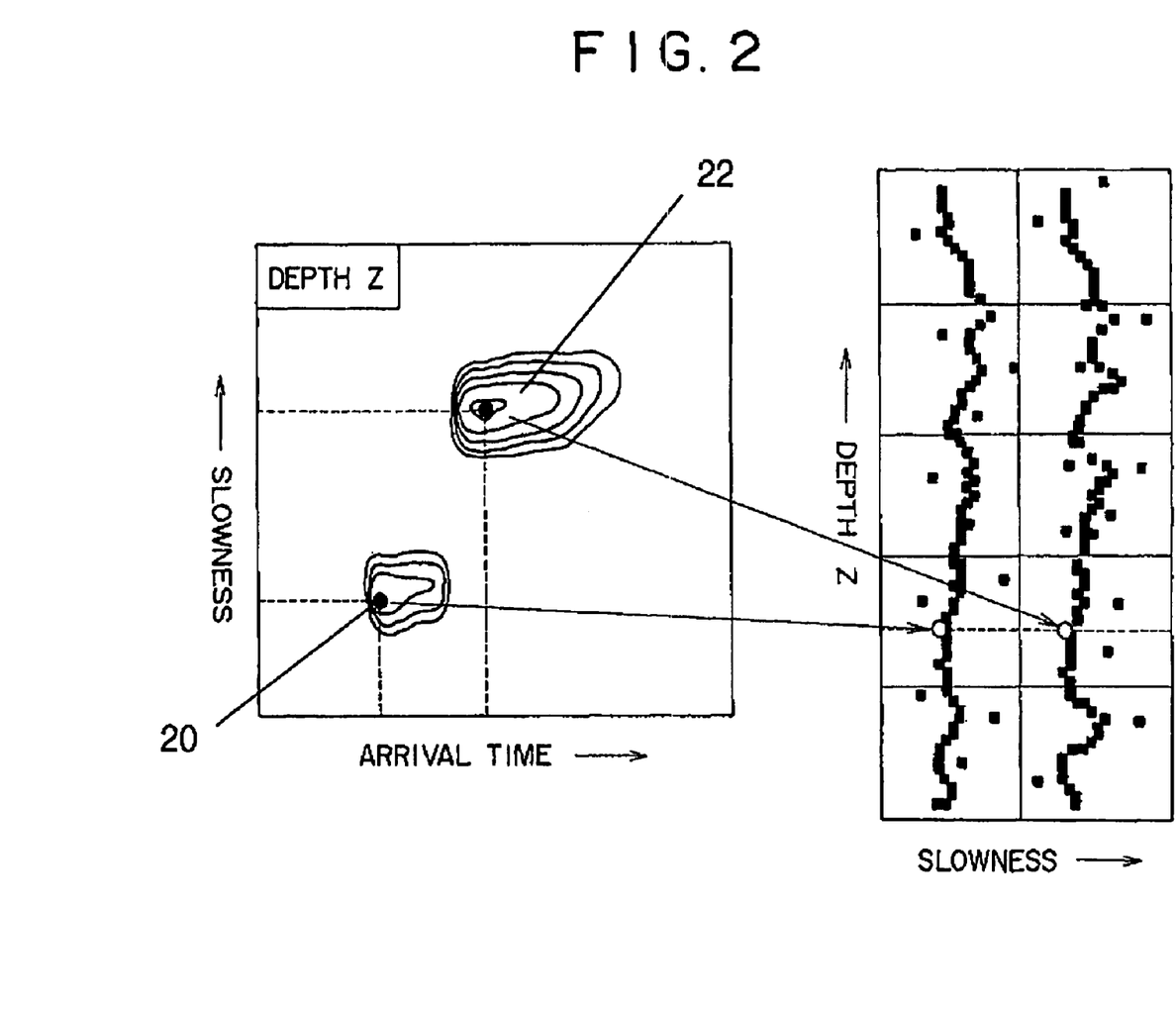
FIG. 2 shows the prior art concept of tracking coherence peaks on slowness versus depth log and classification of the arrivals.

A "track" is defined by a Sequence of measurements over depth and "tracking" involved associating measurements made at one depth with measurements made at other depths. Typically in prior art methods the slowness and arrival time at each coherence peak arc compared with the propagation characteristics of the expected arrivals and classified as to type of arrival and "labeled" or "tacked" as corresponding to compressional (P-wave), shear (S-wave) or Stoneley waveform arrivals. Thus classified, the arrivals produce a continuous log of slowness versus depth, referred to as a "track", a sequence of measurements composed of peaks identified as belonging to the same arrival as shown in FIG. 2. Referring to FIG. 2, peak 20 is classified as a compressional arrival and peak 22 is classified as a shear arrival and the classified peaks are joined to other arrivals of the same waveform in a slowness versus depth log. In prior art methods, the tracking composed two distinct steps 1) joining the peaks corresponding to the same waveform arrival in the track-search step to compose a "track", and 2) identifying the tracks by a name through classification of the tracks. In these methods, individual peaks required classification independent of the tracks.

Correct tracking of the peaks is a difficult process for a number of reasons. Some of the peaks may correspond to spatial aliases rather than the arrival of real waveforms. Some of the peaks may actually be two peaks close together. In general, a shortcoming with prior art methods for tracking is that small changes in sonic waveform data can cause large differences in the final classification.

In a classification method referred to as local classification and described in U.S. patent application Ser. No. 09/591,405 (hereinafter '405), the peaks are classified by referring to only two levels, the current level and the previous level. This local classification of peaks of the tracks is independent of other non-adjacent peaks. Such a classification, because of the limits of the Bayesian algorithm used, does not classify the whole track but just the adjacent peaks of the track at any particular time. These classified peaks are used to generate a track and the track classified based on the classification of the peaks from which it is composed. The '405 method has the advantage of allowing classification to follow the usual data flow of the Integrated Slowness Determination Process (ISDP) processing and is applicable to well site implementation. Nevertheless in some situations local classification is not robust enough nor can defects like jumps between two tracks corresponding to different arrivals or splices on the final log be avoided. There are situations in which a different means of classification is desirable.

SUMMARY OF THE INVENTION

It is an object of the invention to provide methods for more accurately tracking sonic waveform information. It is also an object of the invention to provide methods for tracking sonic measurements into sequences that may be identified as belonging to a single arrival or "track". It is a further object of the invention to provide methods of waveform analysis that can be performed automatically.

The present invention provides a method of determining the sonic slowness of a formation traversed by a borehole comprising generating tracks from sonic waveform peaks received at a plurality of depths, wherein the peaks that are not classified prior to tracking. Generating tracks may comprise classifying long tracks; classifying small tracks; classifying tracks that overlap; filling in gaps; and creating a final log.

Embodiments of the present invention include using non-classified tracks to fill gaps and performing interpolation to fill gaps. An embodiment comprises using time and slowness and not semblance for classification. In accordance with the present invention, tracks may be classified independently of each other.

In a more specific embodiment, long tracks are classified using a method comprising fitting a distribution function on peaks of the track, calculating a mean and variance of the distribution, comparing distribution of the data with a distribution of a model data and classifying according to the model data if said comparison determines that the track data and model data are consistent.

In a further embodiment, small tracks are classified using a method comprising computing a 2-D median of the track, said median being a point defined by corresponding coordinates in a slowness and time domain; determining an intersection of the slowness and time domain with a model data distribution; defining the model in the slowness and time domain as an ellipse; and classifying the small track based on a position of the peak in relation to the model data.

Another embodiment comprise determining if there is a gap in a log corresponding to a selected track at a depth range covered by a selected non-classified track and filling the gap after determining if the selected non-classified track can be used to fill the gap. A further embodiment comprises determining if the selected gap can be used to fill the gap by evaluating if the selected track is between upper part and lower part of a skeleton, wherein said skeleton comprises tracks that have been classified so far. In a specific embodiment, long tracks comprise more than 20 arrival frames, small tracks comprise less than or equal to 20 frames and slowness and time are treated as 2D Gaussian random processes wherein the probability distribution of slowness and time is measured by a 2D Kaman filter process at one depth based on measurements at a previous depth.

Additional objects and advantages of the invention will be apparent to those skilled in the art upon reference to the detailed description and the provided figures.

BRIEF DESCRIPTION OF THE FIGURES

The above objectives and advantages of the present invention will become more apparent by describing in attached figures in which.

DETAILED DESCRIPTION

Referring to FIG. 1, a typical waveform response of an eight-receiver array to a sonic signal from a transmitter is shown. Although reference is made to an eight-receiver array, it will be appreciated that the present method may be used with any number of receivers or any type of source. Using any type of slowness-time-coherence (STC) methodology, examples of which have been described herein, the waveform responses are processed and coherence peaks in the slowness-time plane determined.

Figure 3:
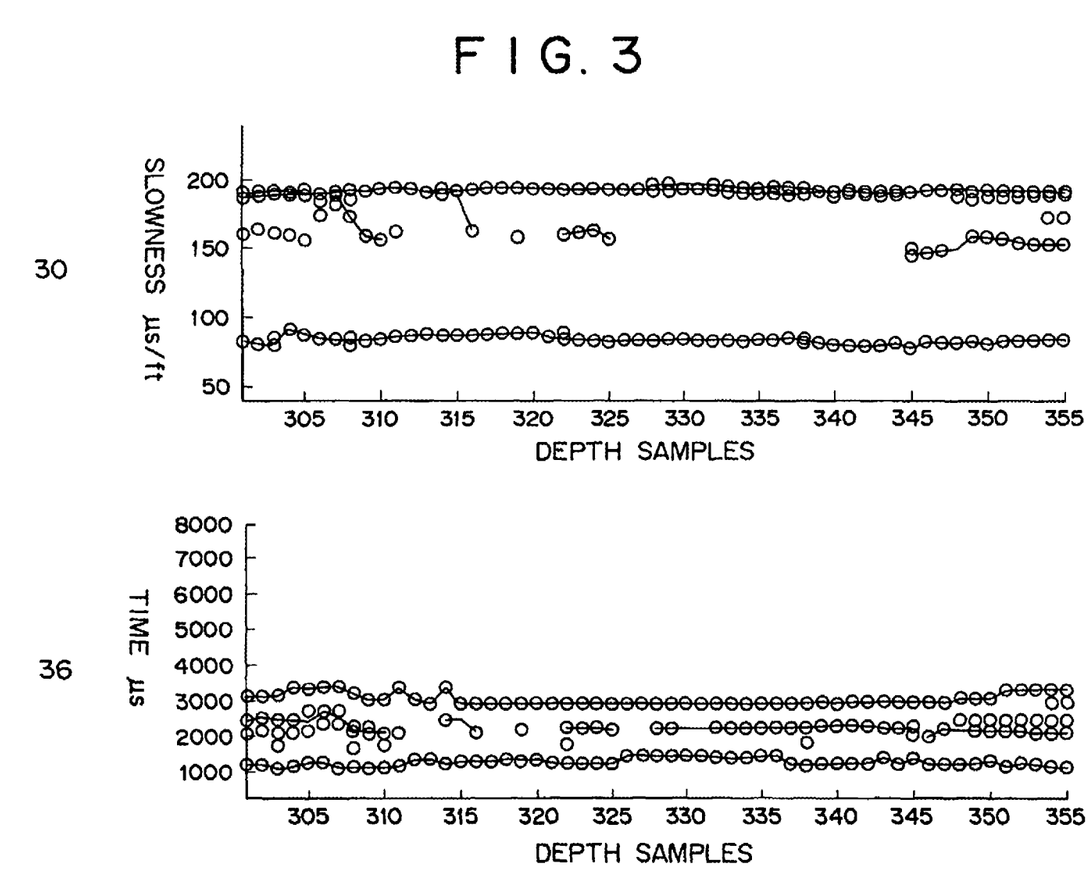
FIG. 3 shows examples of actual data tracks. A track may comprise compressional, shear, Stoneley, flexural or dispersive arrivals. It is important to note that there is only one peak per level per expected waveform arrival.

The present method is used to generate a raw slowness or time track comprising all peaks at a particular depth, wherein the peaks are not previously classified. In this global classification, a raw track is considered as an individual object composed by peaks. These peaks are defined using the semblance, the time and the slowness. In an embodiment of the disclosed technique, only time and slowness and not semblance are used for classification. These raw tracks may include peaks corresponding to compressional (P-waves), shear (S-waves), or Stoneley waves at any particular depth. Referring to FIG. 3, a raw slowness track 30 and raw time track 36 is shown. The present method includes all peak arrivals for each depth without previous classification of the peaks. By this approach, classification of the track is simpler than prior art methods that require a comparison between and classification of individual peaks prior to joining peaks to a track. Once these raw slowness or time tracks have been generated, a method referred to as global classification and shown in FIG. 4 is applied.

Figure 4:
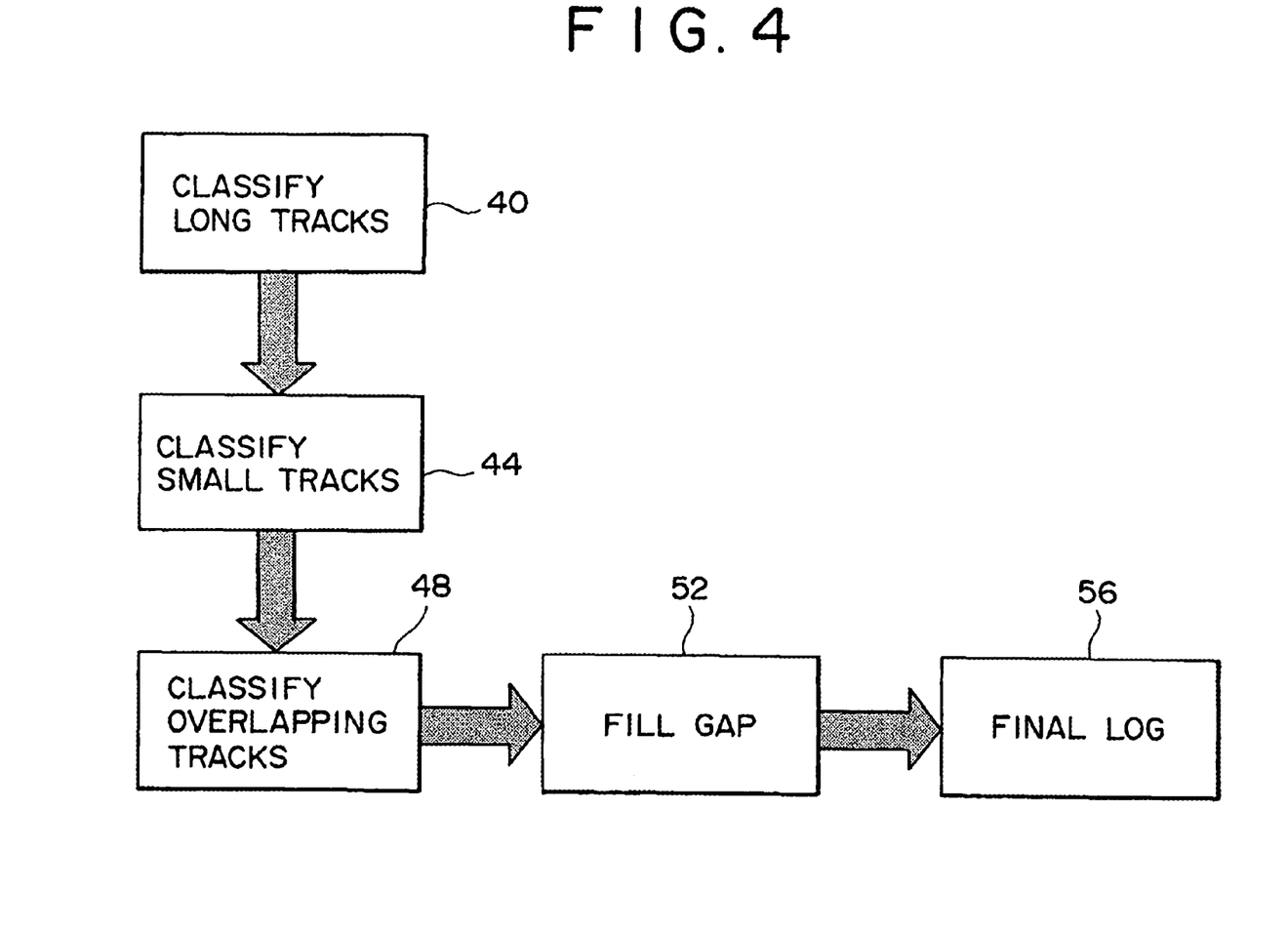
FIG. 4 shows steps in the disclosed global classification method.

Referring to FIG. 4, the technique for global classification comprises 5 steps: 1) classify long tracks 40; 2) classify short tracks 44; 3) classify overlapping tracks 48; 4) fill in gaps 52; and 5) create a final log 56. Two examples of how gaps 52 may be filled are using non-classified tracks to fill the gaps and using linear interpolation. Initially the long tracks are classified. A track is considered to be a long track if the number of peaks in the track is greater than or equal to L. In one embodiment disclosed herein, the value of L corresponds to 20 frames, which translate to 10 feet. This value corresponds to almost 3 times the resolution of the array. However, it should be noted that L could be any number. It should also be noted that values of L corresponding to 20 frames were found to be sufficient to perform statistical analysis on the long track.

Then small tracks are classified. A track is considered to be a small track if the number of peaks in the track is lower than L. Next overlapping tracks are classified. After the tracks are classified, gaps are filled in using either a small portion of the non-classified tracks or by interpolation in the case of small gaps. This enables the formation of a continuous log versus depth using all the information available on the whole interval.

Models are used to classify the tracks. An embodiment uses models having a 2D normal Gaussian distribution in the slowness and time domain. A further embodiment uses a 2D Kalman filter to determine the 2D Gaussian probability distribution of slowness-time plane data. However, the choice of the model is not meant to be restrictive and other models can be used without deviating from the spirit and scope of the disclosed technique. The mean and the variance of these models for the time and the slowness are determined based on the formation type and on the selected mode such as monopole or dipole mode. Typical formation types are defined in PCT/IB00/00353 as fast, intermediate, slow, very slow and extremely slow. These formation types are illustrative and it will be appreciated that the present invention is not restricted to the use of these formation type descriptions. The typical mean and variance of the time and slowness for formation type are determinable from other log data obtained in a number of locations for the waveform arrival under consideration and the selected transmitter mode such as monopole or dipole mode. It should be noted that the model data distribution will be the same for all the different arrivals as the model is constructed using peaks from all arrivals. Only the mean and the variance will vary according to the considered waveform arrival.

Figure 5:
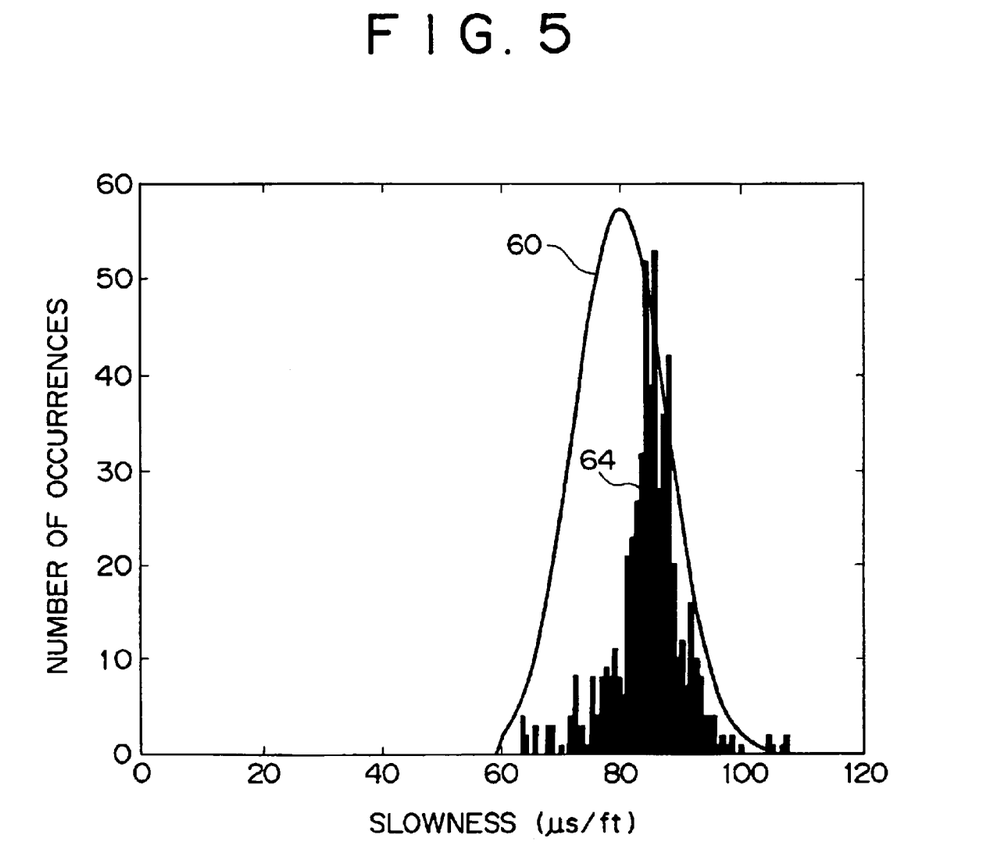
FIG. 5 shows an example of how a Gaussian function is fit on actual track peak waveform data.
Figure 6A:
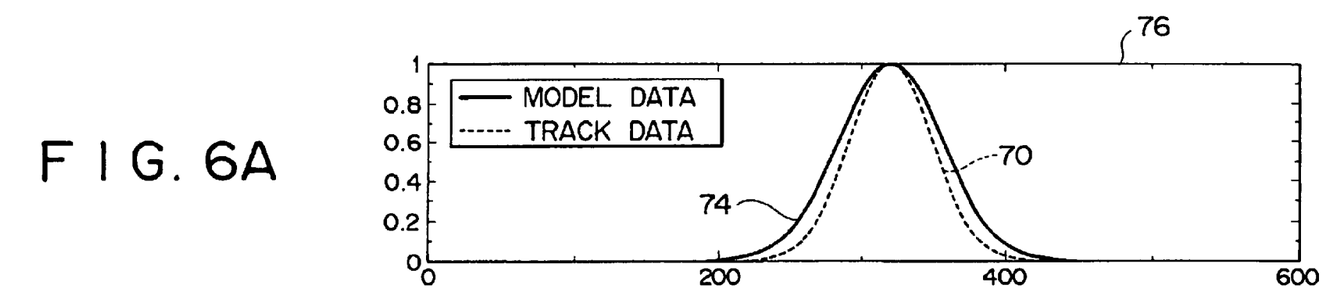
FIGS. 6a, 6b and 6c show the comparison of actual track data with model data.
Figure 6B:
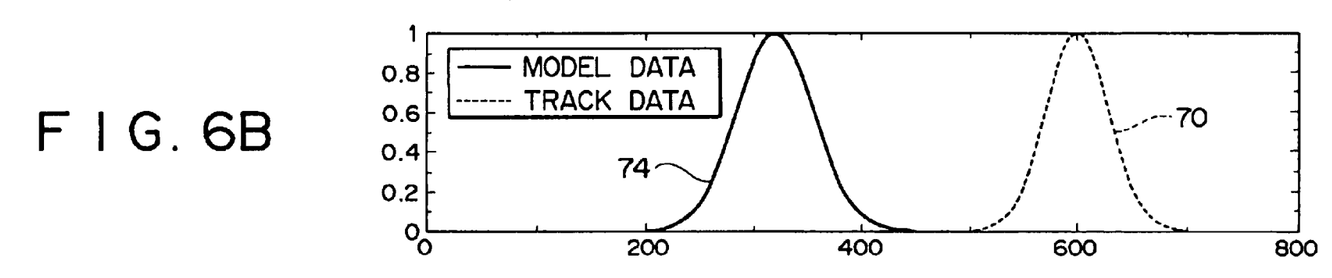
Figure 6C:
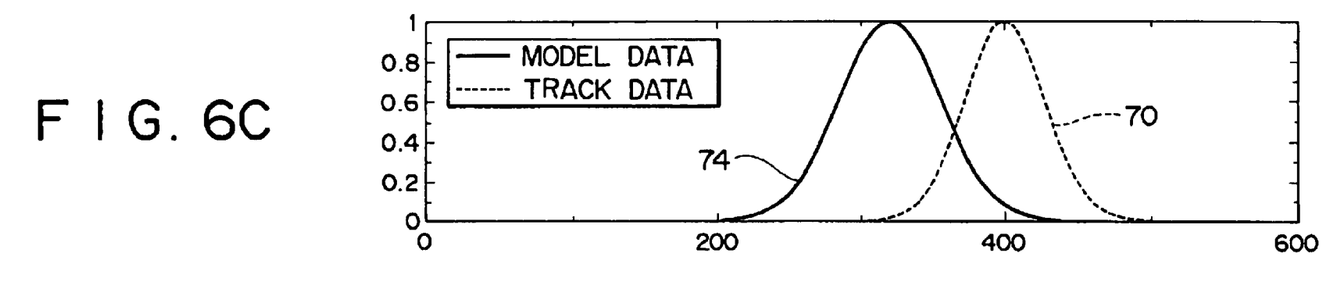

Long tracks are classified by evaluating how the distribution of the peaks of the tracks matched with the model data. The first part of the processing involves fitting a Gaussian function on the data (histogram of the data). It should be noted that the actual data is assumed to be similar distribution to the model data. FIG. 5 illustrates fitting a Gaussian function model 60 on a histogram of data 64 corresponding to an actual track. The variance and the mean of the distribution of actual data is then determined and compared to the mean and variance of the model data. The distribution of the actual data is compared with the model data distribution to define if the two models are consistent. A statistical test may be used to evaluate the consistency and the result of this test is the probability that the current track is consistent with the considered model. FIGS. 6a, 6b and 6c show examples of such a comparison. If the actual track data 70 compares well with the model data 74 such as in FIG. 6a, then the track is classified as the arrival defined by the model data. If the actual track data 70 does not compare well with the model data 74 such as in FIG. 6b, then the track cannot be classified as the arrival defined by the model data; a different waveform model may be applied and compared. If as in FIG. 6c, no waveform model 74 fits the actual data 70, the arrival can be classified as a false alarm. The level of consistency between the data and the model is an indicator of the level of confidence in the classification of the track.

In case of small tracks, there are an insufficient number of peaks on each track to evaluate the distribution of the peaks in a track as in the case of long tracks. Therefore a different procedure is used. A 2-D median of the track is computed. This point will be defined by a specific coordinate in the slowness and time domain, defined as $X_m(S)$, $Y_m(t)$. This coordinate is used to represent the track in the slowness and the time domain.

Figure 7:
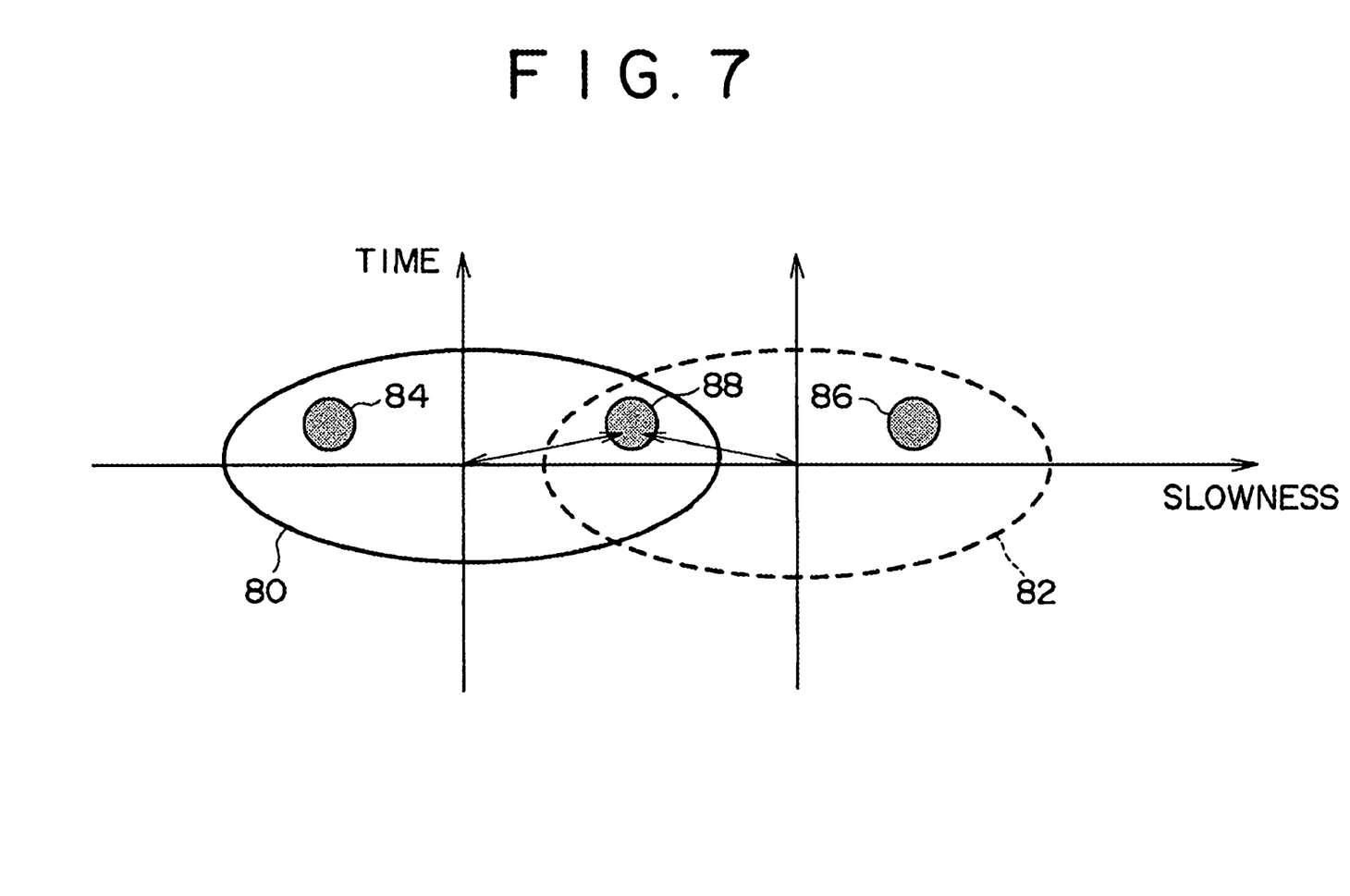
FIG. 7 shows the classification of small tracks using 2-dimensional models.

The slowness-time domain is then intersected with the model data distribution. The model in the slowness time domain is defined as an ellipse, or a circle if the variance of the slowness and the time are the same. FIG. 7 shows such an intersection where compressional model 80 is shown with shear model 82. The position of this peak, corresponding to the defined coordinate, relating to the model data determines how the considered track is classified. If the peak is inside the model, it will be classified as the arrival related to the model. If the peak is not inside the model, it is not classified according to the model. Referring to FIG. 7, peak 84 is classified as a compressional peak, peak 86 is classified as a shear peak and peak 88 is classified by computing its relative closeness to the center of the waveform model that contain it.

An issue in global classification concerns the overlap between two tracks. This case occurs when there are two tracks classified according to the same arrival, which are on the same depth interval. Three different cases need to be considered depending on the relative position of the different tracks (e.g. coextensive, overlapping, and separate). As it is already known the two tracks have the same arrival, the issue here is not how to classify the tracks. Rather, the issue is selecting the best part based on cohererence time and slowness information of the overlapped tracks of each track to build the final log. The best part is selected by comparing the coherence values of the two tracks over all of the interval and selecting the track with the greatest degree of coherence.

After classifying all the long and small tracks, some tracks still remain unused. These tracks were not used because they had small probability compared to others tracks or because they yielded a false alarm; they are referred to as non-classified tracks. The classified tracks produce a skeleton of the final log. The skeleton and the non-classified tracks are used to fill the existing gaps. The gaps are filled based on the possible existing curves. If a monopole mode is considered, the gaps are filled for both compressional arrival and shear arrival. On the other hand, if Stoneley or dipole mode is used only one arrival needs to be checked.

Figure 8:
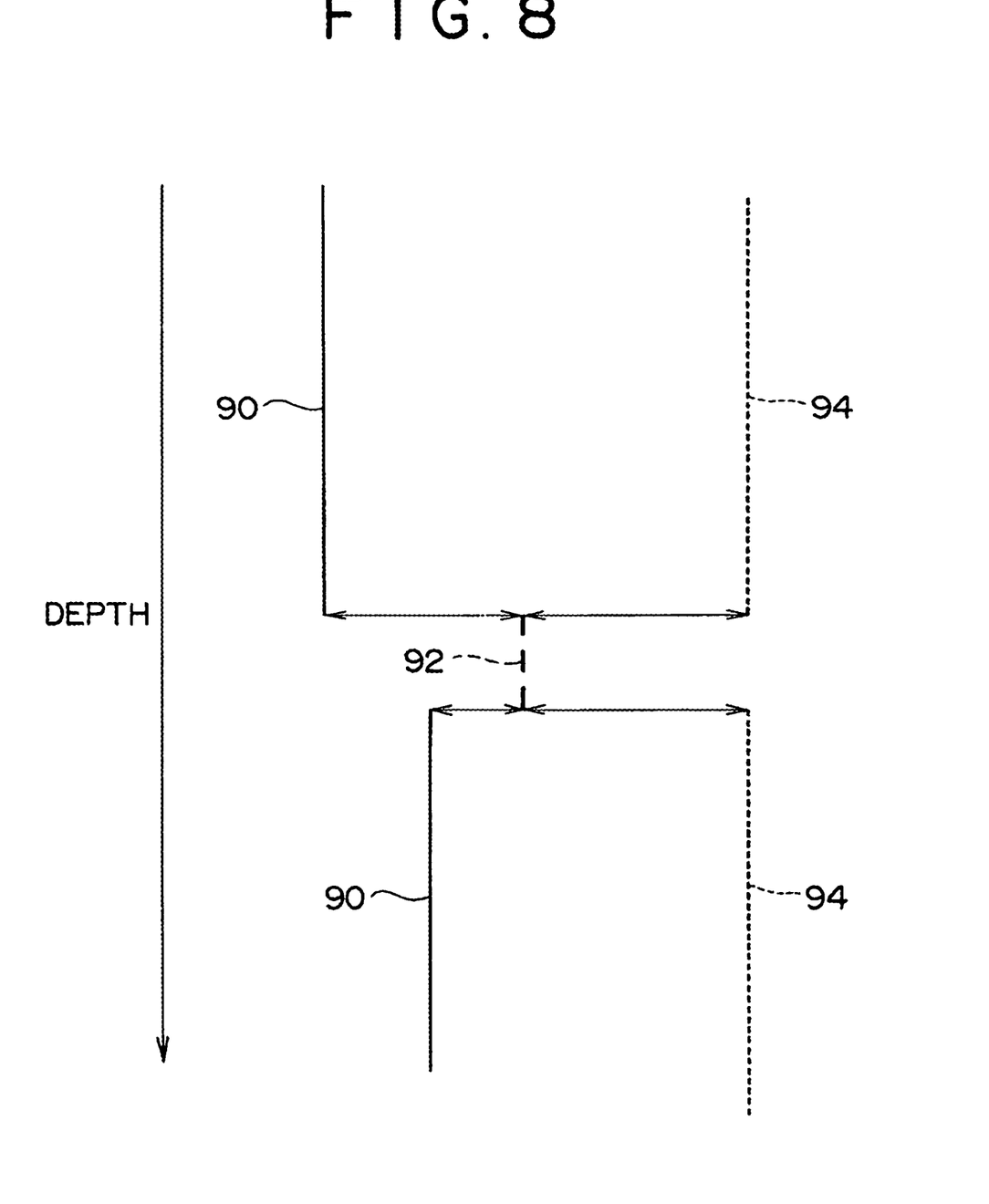
FIG. 8 shows an example of unused tracks for filling gaps.

A track is checked to determine if there is a gap at a certain depth. If a gap exists, then it is determined if whether an unused or non-classified track may be used to fill the gap. Different tests are used to do this determination. Initially, it is determined if the track in the slowness domain is between the upper part and the lower part of the skeleton. If the track is between the upper and lower part of the skeleton, then it is used to fill the gap. If the track is not between the upper and the lower part of the gap in the log, a distance between the track and the skeleton is measured to determine whether that segment is compressional or shear to determine if it is appropriate to fill in the track gaps. FIG. 8 shows an example of a non-classified track 92 may be used to fill the gap in the classified compressional tracks 90 and classified shear tracks 94. Depending on the mode considered, the distance is deemed to be within a certain threshold in which case the track is classified. If the distance is beyond a certain threshold, the track is deleted.

In the example described herein, only one arrival is considered. However, it should be noted that depending on the mode used, all arrivals can be considered. It should be noted that only the slowness part of the track is considered as an indicator for filling the gap. At this stage, time information is not used anymore; the slowness variable is used as a discriminating parameter related to the process.

If a gap in the track remains, interpolation may be used to fill the gap. Prior to this step, all the tracks built have been classified. Nevertheless, there might still be some gaps in the log due to the absence of peaks. For example, at a given depth, no track may have been built or no track may have been classified. In one embodiment described herein, a linear interpolation is made between tracks only if the gap is a small gap, that is, smaller or equal to 5 depth levels. In a further embodiment, the interpolation is linear. However, other interpolations could be used without deviating from the spirit and scope of the disclosed technique.

After all the tracks are classified and the gap filled, a final log of slowness versus depth is generated which comprises the tracks output from the global classification technique.

This way of classifying the tracks is different from prior art methods of classifying, in that complete information on the whole interval is considered. By considering the information on the whole interval, jumps and spikes on final logs, which may result from classification of individual peaks, are avoided. However, in the present method all the peaks must be incorporated into raw tracks and raw slowness or time tracks generated for the entire depth before classification begins. This data flow does not follow the data flow typical of sonic well logging but buffers with a certain number of levels and other software techniques may be used for data storage and retrieval.

In the present global classification technique, the probability of a track to be a compressional or a shear need not be evaluated using all the points forming this track. That is, the probability of each individual peak need not be evaluated but rather the track is considered a single object comprising peaks. Also, the classification of one track may be independent from the others. Correlation between the different tracks need not be considered. For example, in a monopole mode, a track could be classified as compressional arrival, shear arrival, or false alarm. If the actual data could be fit to the waveform models such that it could be either a compressional or shear arrival, it is considered as a false alarm. In a dipole mode, a track can be classified as shear arrival or Stoneley arrival or false alarm.

The global classification technique may be implemented in a computer system. Preferably, the invention is implemented in computer programs executing on programmable computers each comprising a processor, a data storage system (including memory and storage elements), at least one input device, and at least one output device. Program code is applied to input data to perform the functions described above and generate output information. Program code may be implemented in a computer program written in a programming language to communicate with a computer system.

Each such computer program is may be stored on a storage media or device (e.g., ROM or magnetic/optical disk or diskette) readable by a general or special purpose programmable computer, for configuring and operating the computer when the storage media or device is read by the computer to perform the procedures described herein. The technique may also be considered to be implemented as a computer-readable storage medium configured with a computer program, where the storage medium so configured causes a computer to operate in a specific and predefined manner to perform the functions described herein.

Other modifications and variations to the invention will be apparent to those skilled in the art from the foregoing disclosure and teachings. Likewise while a particular apparatus has been described, it will be appreciated that other types and different numbers of sources and receivers could be utilized. Similarly, it will be appreciated that the processing means for processing the obtained wave signals can take any of numerous forms such as a computer, dedicated circuitry, etc. Therefore while only certain embodiments of the invention have been specifically described herein, it will be apparent that numerous modifications may be made thereto without departing from the spirit and scope of the invention.

What is claimed is:

1. A method of determining the sonic slowness of a formation traversed by a borehole comprising:
   receiving sonic waveform data for a plurality of depth intervals;
   generating tracks as individual objects at least for a selected depth interval from the sonic waveform data received;
   classifying the generated tracks within the selected depth interval, wherein the classification is based on the tracks comprising a predetermined number of peaks and all the tracks are generated for the selected depth interval before classification; and
   determining the sonic slowness of a formation and outputting the determined results.

2. The method of claim 1 wherein the classifying the generated tracks comprises classifying long tracks; classifying small tracks; classifying tracks that overlap; filling in gaps; and creating a final log.

3. The method of claim 2, wherein said filling in gaps further comprises using non-classified tracks to fill gaps.

4. The method of claim 3, wherein filling in gaps further comprising performing interpolation.

5. The method of claim 2, wherein said filling in gaps further comprises performing interpolation.

6. The method of claim 5, wherein said interpolation is linear.

7. The method of claim 6 wherein linear interpolation is done if the gaps are less than 6 frames.

8. The method of claim 2, wherein classifying the long tracks further comprises:
   fitting a distribution function on peaks of the track;
   calculating a mean and variance of the distribution;
   comparing distribution of the data with a distribution of a model data; and
   classifying the long track according to the model data if said comparison determines that the track data and model data are consistent.

9. The method of claim 8 wherein slowness and time are treated having Gaussian probability distribution.

10. The method of claim 9 wherein 2D Gaussian probability distribution of slowness and time peaks is measured at one depth based on measurements at a previous depth.

11. The method of claim 9 wherein said measurement is done by a 2D Kalman filter process.

12. The method of claim 2 wherein the classifying the small tracks further comprises:
computing a 2-D median of the track, said median being a point defined by corresponding coordinates in a slowness and time domain;
determining an intersection of the slowness and time domain with a model data distribution;
defining the model in the slowness and time domain as an ellipse; and
classifying the small track based on a position of the peak in relation to the model data.

13. The method of claim 12, wherein said model is one of a compressional model and shear model.

14. The method of claim 2, wherein step of filling in the gaps further comprises:
determining if there is a gap in a selected track at a depth range covered by the selected non-classified track;
deleting the track if no gap is found; and
filling the gap in the selected track after determining that the selected non-classified track can be used to fill the gap.

15. The method of claim 14, wherein said determining if the selected track can be used to fill the gap is done by evaluating if the selected track is between upper part and lower part of a skeleton, wherein said skeleton comprises tracks that have been classified so far.

16. The method of claim 2, wherein said long track comprises more than 20 frames.

17. The method of claim 2, wherein said small track comprises less than or equal to 20 frames.

18. The method of claim 1 wherein said peaks are defined using semblance, time and slowness.

19. The method of claim 18 wherein only time and slowness are used for classification.

20. The method of claim 19, wherein a probability of a track being one of a compressional and shear is determined using all points forming the track.

21. The method of claim 20, wherein classification of one track is independent of classification of a track different from said one track.

22. The method of claim 1, wherein the sonic waveform peaks are received at more than two depths.

23. A computer system for performing a method of determining the sonic slowness of a formation traversed by a borehole comprising:
receiving sonic waveform data for a plurality of depth intervals;
generating tracks as individual objects at least for a selected depth intervals from the sonic waveform data received;
classifying the generated tracks within the selected depth interval, wherein the classification is based on the tracks comprising a predetermined number of peaks and all the tracks are generated for the selected depth interval before classification; and
determining the sonic slowness of a formation and outputting the determined results, wherein the method is implemented in a program stored on a storage media and the output of the determined sonic slowness is applied to at least one output device.

24. A method of determining the sonic slowness of a formation traversed by a borehole comprising:
generating tracks from sonic waveform peaks received at a plurality of depths, wherein the step of generating tracks comprises:
a) classifying long tracks;
b) classifying small tracks;
c) classifying tracks that overlap;
d) filling in gaps; and
e) creating a final log.

25. The method of claim 24, wherein said filling in gaps further comprises using non-classified tracks to fill gaps.

26. The method of claim 25, wherein filling in gaps further comprising performing interpolation.

27. The method of claim 24, wherein said filling in gaps further comprises performing interpolation.

28. The method of claim 27, wherein said interpolation is liner.

29. The method of claim 28, wherein linear interpolation is done if the gaps are less than 6 frames.

30. The method of claim 24, wherein tracks are considered as individual objects comprising peaks.

31. The method of claim 30, wherein said peaks are defined using semblance, time and slowness.

32. The method of claim 31, wherein only time and slowness are used for classification.

33. The method of claim 32, wherein a probability of a track being one of a compressional and shear is determined using all points forming the track.

34. The method of claim 24, wherein classification of one track is independent of classification of a track different from said one track.

35. The method of claim 24, wherein step of classifying the long tracks further comprises:
fitting a distribution function on peaks of the track;
calculating a mean and variance of the distribution;
comparing distribution of the data with a distribution of a model data; and
classifying the long track according to the model data if said comparison determines that the track data and model data are consistent.

36. The method of claim 35, wherein slowness and time are treated having Gaussian probability distribution.

37. The method of claim 36, wherein 2D Gaussian probability distribution of slowness and time peaks is measured at one depth based on measurements at a previous depth.

38. The method of claim 36, wherein said measurement is done by a 2D Kalman filter process.

39. The method of claim 24, wherein step of classifying the small tracks further comprises:
computing a 2-D median of the track, said median being a point defined by corresponding coordinates in a slowness and time domain;
determining an intersection of the slowness and time domain with a model data distribution;
defining the model in the slowness and time domain as an ellipse; and
classifying the small track based on a position of the peak in relation to the model data.

40. The method of claim 39, wherein said model is one of a compressional model and shear model.

41. The method of claim 24, wherein step of filling in the gaps further comprises:
   determining if there is a gap in a selected track at a depth range covered by the selected non-classified track;
   deleting the track if no gap is found; and
   filling the gap in the selected track after determining that the selected non-classified track can be used to fill the gap.

42. The method of claim 41, wherein said determining if the selected track can be used to fill the gap is done by evaluating if the selected track is between upper part and lower part of a skeleton, wherein said skeleton comprises tracks that have been classified so far.

43. The method of claim 24, wherein said long track comprises more than 20 frames.

44. The method of claim 24, wherein said small track comprises less than or equal to 20 frames.

* * * * *